United States Patent
Dwivedi et al.

(10) Patent No.: US 11,354,834 B2
(45) Date of Patent: Jun. 7, 2022

(54) LEARNING-BASED VOXEL EVOLUTION FOR REGULARIZED RECONSTRUCTION

(71) Applicant: KONINKLIJKE PHILIPS N.V., Eindhoven (NL)

(72) Inventors: Shekhar Dwivedi, Willoughby Hills, OH (US); Chuanyong Bai, Solon, OH (US); Andriy Andreyev, Willoughby Hills, OH (US); Bin Zhang, Cleveland, OH (US); Zhiqiang Hu, Twinsburg, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 28 days.

(21) Appl. No.: 16/957,372

(22) PCT Filed: Dec. 24, 2018

(86) PCT No.: PCT/EP2018/086838
§ 371 (c)(1),
(2) Date: Jun. 23, 2020

(87) PCT Pub. No.: WO2019/134871
PCT Pub. Date: Jul. 11, 2019

(65) Prior Publication Data
US 2020/0334873 A1    Oct. 22, 2020

Related U.S. Application Data (60) Provisional application No. 62/612,828, filed on Jan. 2, 2018.

(51) Int. Cl.
| | |
|---|---|
| *G06T 11/00* | (2006.01) |
| *G06T 7/73* | (2017.01) |
| *G06T 7/13* | (2017.01) |
| *G06T 5/40* | (2006.01) |
| *G06T 7/00* | (2017.01) |

(52) U.S. Cl.
CPC .............. *G06T 11/008* (2013.01); *G06T 5/40* (2013.01); *G06T 7/0012* (2013.01); *G06T 7/13* (2017.01);
(Continued)

(58) Field of Classification Search
CPC . G06T 11/008; G06T 7/73; G06T 7/13; G06T 5/40; G06T 7/0012;
(Continued)

(56) References Cited

U.S. PATENT DOCUMENTS

| | | |
|---|---|---|
| 9,449,403 B2 | 9/2016 | Jerebko |
| 2017/0039706 A1 | 2/2017 | Mikhno |

(Continued)

FOREIGN PATENT DOCUMENTS

| | | |
|---|---|---|
| JP | 3603543 B2 | 12/2004 |
| WO | 2014197658 A1 | 12/2014 |
| WO | 2017174627 A1 | 10/2017 |

OTHER PUBLICATIONS

Tanaka. "Improved Iterative Image Reconstruction with Automatic Noise Artifact Suppression." IEEE Transactions on Medical Imaging, vol. 11, No. 1, Mar. 1992, pp. 21-27 (Year: 1992).*

(Continued)

*Primary Examiner* — Jon Chang (57) ABSTRACT

A non-transitory computer-readable medium stores instructions readable and executable by at least one electronic processor (20) to perform an image reconstruction method (100). The method includes: performing iterative image reconstruction of imaging data acquired using an image acquisition device (12); selecting an update image from a plurality of update images produced by the iterative image reconstruction; processing the selected update image to generate a hot spot artifact map; and suppressing hot spots (Continued)

identified by the generated hot spot artifact map in a reconstructed image output by the iterative image reconstruction.

20 Claims, 9 Drawing Sheets

(52) U.S. Cl.
CPC ...... *G06T 7/73* (2017.01); *G06T 2207/10072* (2013.01); *G06T 2207/30004* (2013.01); *G06T 2207/30242* (2013.01); *G06T 2211/424* (2013.01)

(58) Field of Classification Search
CPC . G06T 2207/10072; G06T 2207/30004; G06T 2207/30242; G06T 2211/424; G06T 11/006; G06T 2207/10104
See application file for complete search history.

(56) References Cited

U.S. PATENT DOCUMENTS

2019/0043225 A1* 2/2019 Kwak .................. G06T 11/008
2019/0228546 A1* 7/2019 Andreyev ............. G06T 11/006
2019/0355158 A1* 11/2019 Salomon ............... G01T 1/2985

OTHER PUBLICATIONS

Slijpen et al. "Comparison of Post-Filtering and Filtering Between Iterations for SPECT Reconstruction." IEEE Nuclear Science Symposium Conference Record, IEEE Nuclear Science Symposium and Medical Imaging Conference, Nov. 8, 1998, pp. 1363-1366 (Year: 1998).*

Nawaz et al. "Metal Artifact Reduction in X-ray CT Imaging based on Iterative Reconstruction Approach." IEEE International Conference on Mechatronics and Automation, Aug. 2, 2015, pp. 2420-2425 (Year: 2015).*

International Search Report and Written Opinion of PCT/EP2018/086838, dated Feb. 26, 2019.

Kobayashi, Tetsuya et al "Fusion of Image Reconstruction and Lesion Detection using a Bayesian Framework for PET/SPECT", IEEE Nuclear Science Symposium Conference Record, 2008.

Andreyev, Andriy et al "Relative Difference Prior with Dynamic Edge Preservation Parameter", Journal of Nuclear Medicine, vol. 58, No. 1, pay 2017, pp. 744.

* cited by examiner

LEARNING-BASED VOXEL EVOLUTION FOR REGULARIZED RECONSTRUCTION

CROSS-REFERENCE TO PRIOR APPLICATIONS

This application is the U.S. National Phase application under 35 U.S.C. § 371 of International Application No. PCT/EP2018/086838, filed on Dec. 24, 2018, which claims the benefit of U.S. Provisional Patent Application No. 62/612,828, filed on Jan. 2, 2018. These applications are hereby incorporated by reference herein.

FIELD

The following relates generally to the medical imaging arts, medical image interpretation arts, image reconstruction arts, and related arts.

BACKGROUND

Removal of false hot pixels in the regularized iterative image reconstruction is a challenging problem to solve. Hot spot artifacts are a particularly problematic type of artifact that can be introduced during iterative reconstruction, especially of the type employing edge-preserving regularization. Hot spot artifacts are generated when random noise intensity fluctuation becomes large enough to satisfy the edge preservation threshold of the regularization. In this case, it becomes preserved and can be mistaken for a "real" hot spot due to a tumor or lesion. Efforts have been made to tune the parameters, and apply fitting techniques across iteration images to solve this problem with an average success rate.

The following discloses new and improved systems and methods to overcome these problems.

SUMMARY

In one disclosed aspect, a non-transitory computer-readable medium stores instructions readable and executable by at least one electronic processor to perform an image reconstruction method. The method includes: performing iterative image reconstruction of imaging data acquired using an image acquisition device; selecting an update image from a plurality of update images produced by the iterative image reconstruction; processing the selected update image to generate a hot spot artifact map; and suppressing hot spots identified by the generated hot spot artifact map in a reconstructed image output by the iterative image reconstruction.

In another disclosed aspect, an image processing device includes an electronic processor; and a non-transitory computer-readable medium storing instructions readable and executable by the electronic processor to perform an image reconstruction method. The method includes: performing iterative image reconstruction of imaging data acquired using an image acquisition device; selecting an update image from a plurality of update images produced by the iterative image reconstruction; processing the selected update image to generate a hot spot artifact map; and suppressing hot spots identified by the generated hot spot artifact map in a reconstructed image output by the iterative image reconstruction.

In another disclosed aspect, an image processing device includes an electronic processor; and a non-transitory computer-readable medium storing instructions readable and executable by the electronic processor to perform an image reconstruction method. The method includes: performing iterative image reconstruction of imaging data acquired using an image acquisition device; generating a hot spot artifact map from an update image produced by the iterative image reconstruction using an iterative process in which each iteration includes (i) thresholding the pixels of the update image using a threshold selected for the iteration to produce a thresholded image and (ii) performing a three-dimensional connectivity analysis on the thresholded image to identify suspected hot spots and background regions; and suppressing the hot spots identified by the hot spot artifact map in a reconstructed image output by the iterative image reconstruction.

One advantage resides in the removal of hot spot pixels that are generated in the process of regularized iterative image reconstruction or iterative image post processing.

Another advantage resides in an imaging system that does not require additional parameter tuning.

Another advantage resides in an adaptable imaging system to perform hot spot removal by adapting and automating the process with no need to import any prior learning models or templates.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure.

DETAILED DESCRIPTION

Disclosed herein is a plug-in for an image reconstruction system that generates a map of hot spot artifacts. These may be variously used, e.g. as a mask for removal from the final image, or as feedback to the iterative image reconstruction. The disclosed hot spot artifact detector has several components.

In some embodiments, the plug-in operates on an iteration image generated during the iterative reconstruction. The iteration image chosen to be processed to detect hot spot artifacts can be generated relatively early in the iterative reconstruction, and hence the hot spot artifact map derived from this iteration image may be made available before completion of the reconstruction, e.g. to serve as feedback for later iterations. In one approach the iteration image is chosen as the first image at which the iteration-over-iteration change in image content falls below a criterion (i.e. when the iterative reconstruction is beginning to converge). Alternatively, a fixed iteration image may be chosen, e.g. the fifth iteration image. The detection of hot spot artifacts can be performed in real time for several images in an iteration sequence, and then further processed (e.g., with a voting algorithm) to determine true hot spots.

In some embodiments, the image reconstruction system utilizes an iterative process in which the iteration image is processed to select a threshold for identifying hot spots (both real and artifact), processing the identified hot spots to categorize as real, artifact, or uncertain, adding the hot spots classified as artifact to a hot spot artifact map, updating the image by replacing both the hot spots categorized as real and the hot spots categorized as artifacts with background pixel intensity with a value derived from, for example, a voting algorithm, in an immediate neighborhood of the hot spots, and repeating this process on the updated image iteratively until no hot spots remain. This iterative process advantageously detects low contrast hot spot artifacts more effectively in the later iterations due to the iteration-over-iteration adjustments in the threshold.

In other embodiments, the plug-in performs the threshold-based hot spot identification in 2D image slices, while the categorization of the identified hot spots is performed in 3D after merging hot spots identified in the 2D slices using a 3D region-growing connectivity analysis. This approach combines more effective identification of hot spots in the 2D slice space with more accurate categorization of the identified hot spots in 3D volume space.

In further embodiments, the threshold-based hot spot identification employs an edge detection transform (e.g., a modified 2D Laplacian edge enhancement processing) to improve the hot spot identification.

In some embodiments, the hot spot classification optionally uses a learning based approach. Here, the iteration-over-iteration evolution of all identified hot spots of a given intensity class (i.e. intensity histogram bin) is averaged to generate a "typical" evolution under the expectation that most hot spots are real (that is, are not artifacts). Then the iteration-over-iteration evolution of each hot spot to be classified is quantitatively compared with the "typical" evolution, and if it differs by more than a criterion difference then it is labeled an artifact. The learning may combine parameters learned from historical data with the "typical" evolution which is "learned" from the hot spots of the imaging data under reconstruction.

Other contemplated embodiments include various usages of the generated hot spot artifact map. In one application, it is used as a mask after the iterative reconstruction is completed, to remove the artifacts. In another application, the mask is generated before the iterative reconstruction is complete, to suppress the hot spots. As a further variant, it might be advantageous to present medical personnel with the images with/without the hot spot artifacts removed, so that medical personnel can independently assess whether they believe the removed hot spots are indeed artifacts.

Although described herein for PET imaging systems, the disclosed approaches can be a hybrid PET/computed tomography (CT) imaging systems; a gamma camera single photon emission computed tomography (SPECT) imaging systems, hybrid SPECT/CT imaging systems, hybrid PET magnetic resonance (MR) imaging systems, and the like.

Figure 1:
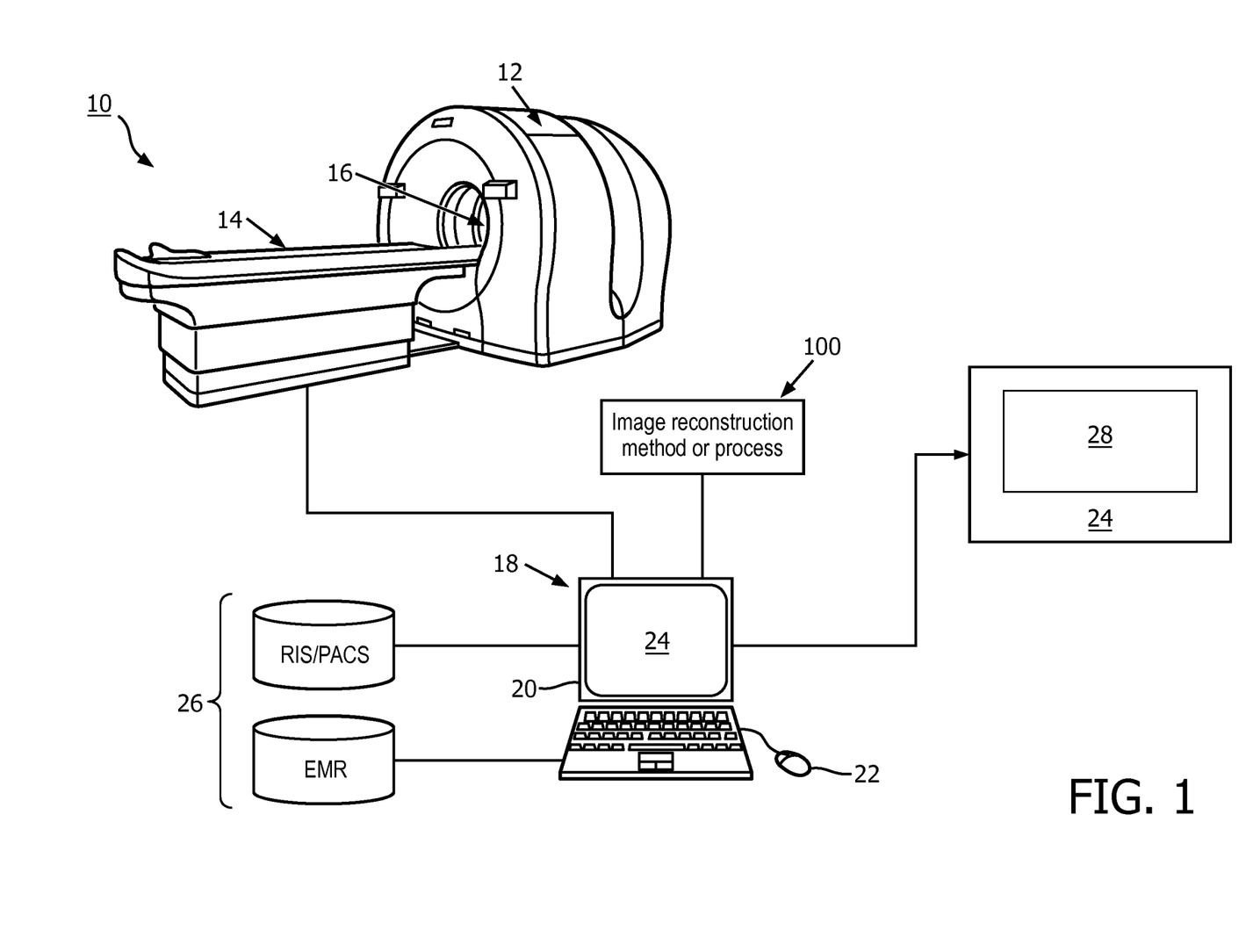
FIG. 1 diagrammatically shows image reconstruction system according to one aspect.

With reference to FIG. 1, an illustrative medical imaging system 10 is shown. As shown in FIG. 1, the system 10 includes an emission image acquisition device 12. In one example, the image acquisition device 12 can comprise a PET imaging device. In other examples, the image acquisition device 12 can be any other suitable image acquisition device (e.g., SPECT, hybrid devices, and the like). A patient table 14 is arranged to load a patient into an examination region 16, and more particularly can move a prone or supine patient axially either into the examination region of the PET scanner 12 for PET imaging.

The system 10 also includes a computer or workstation or other electronic data processing device 18 with typical components, such as at least one electronic processor 20, at least one user input device (e.g., a mouse, a keyboard, a trackball, and/or the like) 22, and a display device 24. In some embodiments, the display device 24 can be a separate component from the computer 18. The workstation 18 can also include one or more databases or non-transitory storage media 26 (such as a magnetic disk, RAID, or other magnetic storage medium; a solid state drive, flash drive, electronically erasable read-only memory (EEROM) or other electronic memory; an optical disk or other optical storage; various combinations thereof; or so forth), that store one or more databases (e.g., an electronic medical record (EMR) database, a Radiology Information System (RIS) and/or Picture Archiving and Communication System (PACS) database, and the like). The display device 24 is configured to display a graphical user interface (GUI) 28 including one or more fields to receive a user input from the user input device 22.

The at least one electronic processor 20 is operatively connected with the one or more non-transitory storage media 26 which further stores instructions which are readable and executable by the at least one electronic processor 20 to perform disclosed operations including performing an image reconstruction method or process 100. In some examples, the image reconstruction method or process 100 may be performed at least in part by cloud processing.

Figure 2:
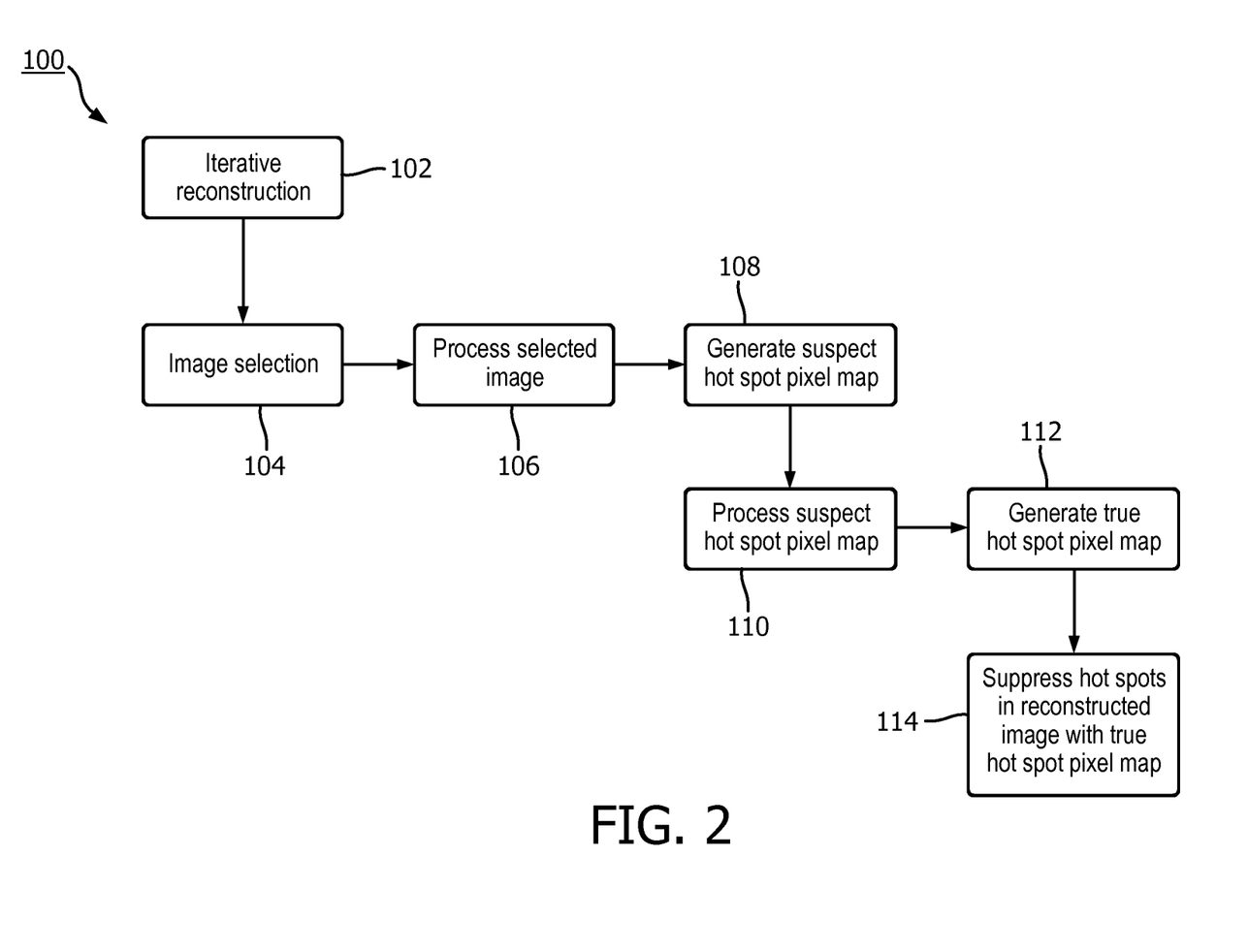
FIG. 2 shows an exemplary flow chart operation of the system of FIG. 1.

With reference to FIG. 2, an illustrative embodiment of the image reconstruction method 100 is diagrammatically shown as a flowchart.

At 102, the at least one electronic processor 20 is programmed to perform iterative image reconstruction of imaging data acquired using the image acquisition device 12.

At 104, the at least one electronic processor 20 is programmed to select an update image from a plurality of update images produced by the iterative image reconstruction.

At 106, the at least one electronic processor 20 is programmed to process the selected update image.

At 108, the at least one electronic processor 20 is programmed to generate a suspect hot spot artifact map from the processing of the selected image.

At 110, the at least one electronic processor 20 is programmed to process the generated suspect hot spot artifact map.

At 112, the at least one electronic processor 20 is programmed to generate a true hot spot artifact map from the processing of the suspect hot spot artifact map.

At 114, the at least one electronic processor 20 is programmed to suppress hot spots identified by the generated true hot spot artifact map in a reconstructed image output by the iterative image reconstruction.

In some embodiments, the selecting of the update image from the plurality of update images produced by the iterative image reconstruction (i.e., operations 102 and 104) includes determining a maximum number of suspected hot spots in each of the obtained images; determining when the maximum number of suspected hot spots in each of the obtained images is constant; and selecting the image at the determination of the constant number of suspected hot spots.

The image selection operation 104 selects the "most appropriate" image that can be used to localize the suspect hot pixels. This most appropriate image has maximum number of suspect hot pixels among all iteration images. Starting with a first iteration image, the image selection process locates a maximum intensity class of pixels. A maximum intensity class is located for all iteration images, until the maxima class becomes constant for two consecutive iterations. When this maximum number becomes constant, that iteration image is considered to be selected.

Figure 3:
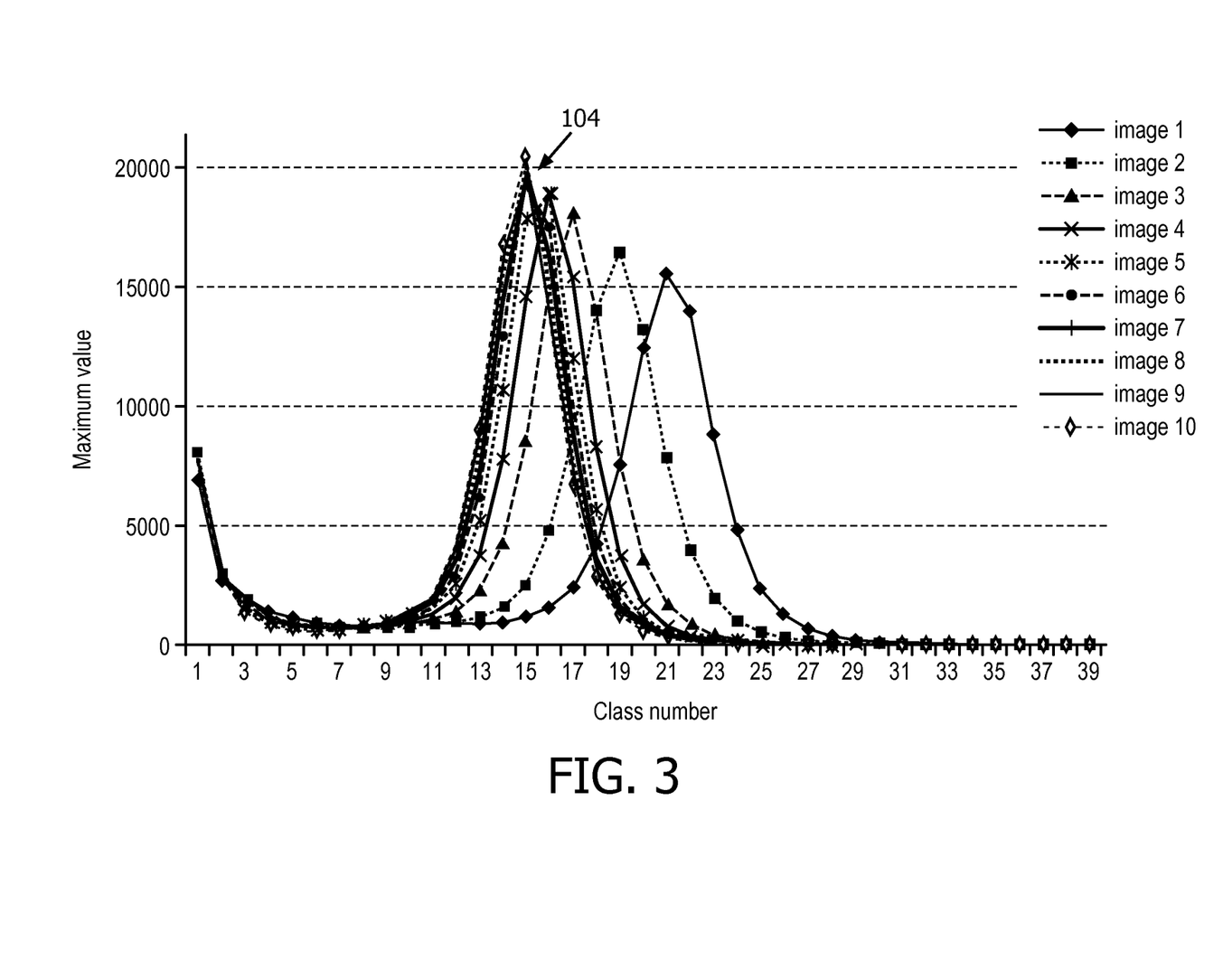
FIG. 3 shows a graph for an operation of the flow chart of FIG. 2.

FIG. 3 shows an example of the image selection process. As shown in FIG. 3, the maxima class (e.g., a location of a peak) is decreasing with increase in the iteration number of images, and becomes constant after iteration image 6. Thus iteration image 6 is selected image.

In some embodiments, the processing operation 106 includes labeling features and background in the selected image from imaging counts in the selected image with a three dimensional connected components analysis; removing the labeled features and background in the selected image; and updating the selected image with the removed features and background. In other embodiments, the processing operation 106 includes labeling suspected hot spots in the selected image with the three dimensional connected components analysis; applying a hot spot suspect qualification process to the labeled suspected hot spots to determine hot spots in the selected image; generating the hot spot artifact map with the determined hot spots; and updating a pixel updating process with the determined hot spots. The labeling, applying, generating, and updating are repeated until no imaging counts remain in the selected image. In further embodiments, the hot spot suspect qualification process includes determining whether a hot spot is a true hot spot based on analysis of a window of neighboring image pixels including the suspected hot spot; and updating the pixel updating process with the determined true hot spots. In still other embodiments, the processing operation 106 includes normalizing the selected image; applying an edge detection transform (e.g., a modified Laplacian transform to the normalized image); generating a histogram representing a pixel count of the image having the Laplacian transform applied thereto; determining a binning configuration of the histogram; and determining one or more hot spots in the selected image using the binning configuration.

Figure 4:
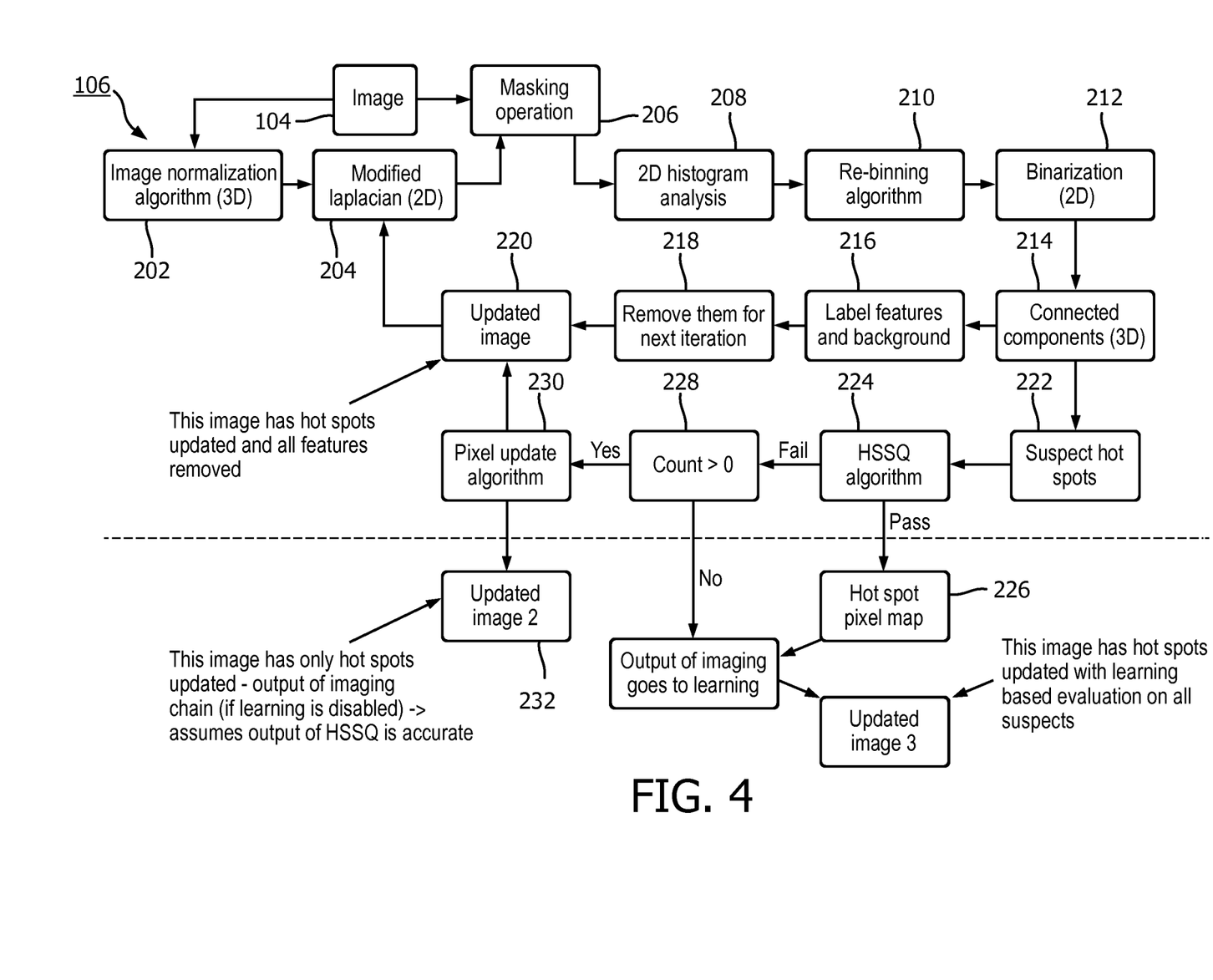
FIG. 4 shows an exemplary flow chart operation of some of the operations of FIG. 2.
Figure 5:
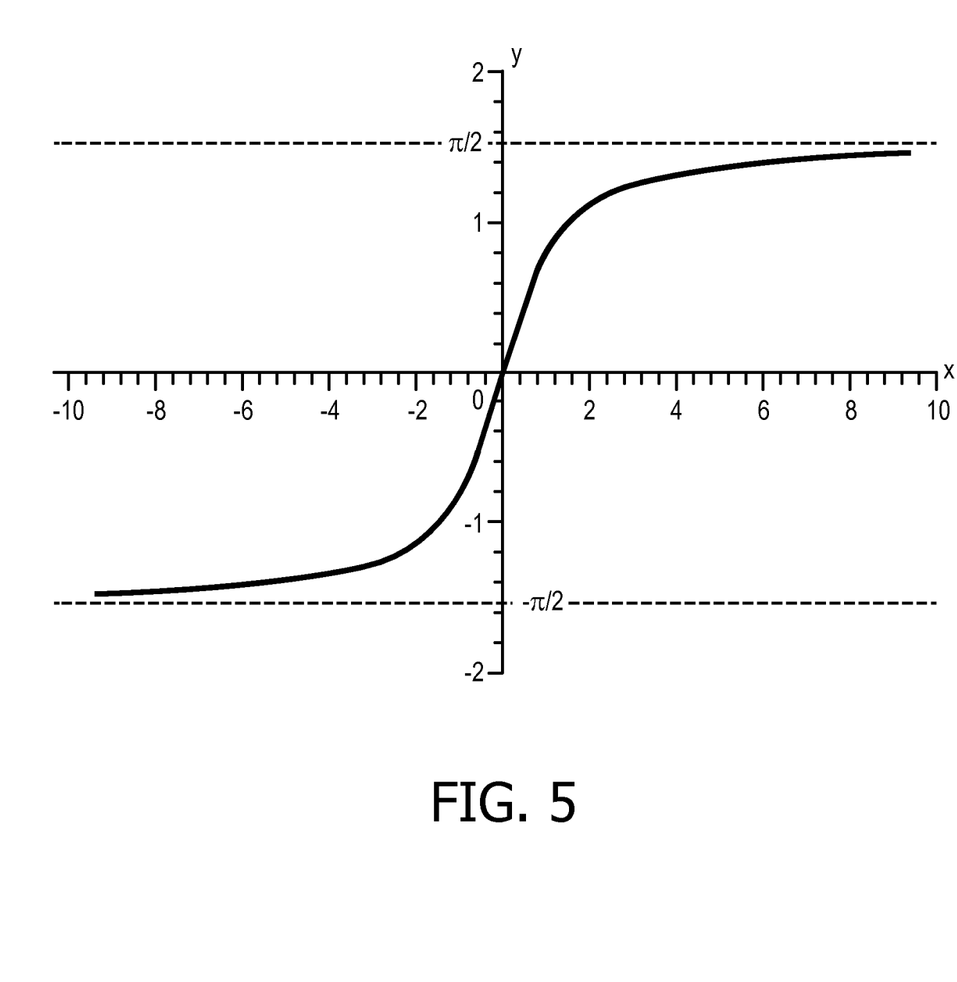
FIG. 5 shows a graph of a kernel for an operation of the flow chart of FIG. 2.

FIG. 4 shows that the processing operation 106 includes operations 202-234. At 202, the selected image (e.g., selected at operation 104) is normalized with a 3D image normalization algorithm. The image normalization process brings all the pixel intensities in the image into a pre-defined range. In some examples, the normalization algorithm is implemented using an arctangent function so that high intensity pixels are spread out and low intensity pixels are all clubbed towards the origin. Spread out high intensity pixels are useful in localizing the features and the false hot pixels using imaging techniques. Equation 1 is used in determining the normalized pixel intensity, $$P_x = f(P_x/P_{max}) * N_{const}$$

where $P_x$ is the pixel intensity and Pmax is the maximum pixel intensity in the 3D (or 2D slice) volume. In some examples, the function f( ) can be any suitable function (e.g., arctangent, sigmoid, modified sigmoid, a rectified linear unit, and other similar algorithms that restrict an intensity range to a pre-defined range). FIG. 5 shows an example of a normalization kernel used in the normalization operation 202, in which the x-axis shows an original pixel intensity, and the y-axis shows a normalized pixel intensity.

At 204, the normalized image is processed with a 2D modified Laplacian transform. The transform adds more weight to central pixels of the normalized image to highlight edges of the image. Stated another way, the transform is an edge-preserving transform.

At 206, the image with the transform applied to is processed with a masking operation. The masking operation ensures that all features in the original image are captured.

At 208, the image is processed with a 2D histogram analysis. The histogram is generated as a function of an intensity of bins in the image versus the pixel count in the bins of the image.

At 210, the histogram is processed with a re-binning algorithm. The re-binning algorithm sets a threshold for each image slice to optimize features and background in the image.

At 212, the image is processed with a 2D binarization process. The binarization process identifies all the suspected hot spots in the image such that the spots become a single spot (by virtue of being in 2D space rather than 3D space).

At 214, the image is processed with a 3D connected components process. The connected components process is a region-growing algorithm used to select all features in the image.

From the 3D connected components process 214, the image is subjected to two processing loops in which a first loop includes operations 216-220 and a second loop includes operations 222-234. At 216, features (e.g., bones, cardiac wall uptake, other significant lesions and structures, and the like) and background are identified in the image. At 218, the features and background are removed from the image. At 220, the image is updated with the removed features and background. This updated is then processed with the 2D modified Laplacian (at 208), and operations 208-218 are repeated for the updated image.

At 222, after the connected components process (at 214), suspected hot spots are identified in the image. At 224, the image is processed with a hot spot suspect qualification (HSSQ) process applied to each hot spot candidate to determine whether the suspected hot spots are true hot spots (i.e., not a real object but an enhanced noise fluctuations). If a suspected hot spot is determined to be true, then, at 226, the hot spot is added to the hot spot pixel map (i.e., operation 108). If a suspected hot spot is determined to be false, then, at 228, it is determined whether the number of counts remaining is greater than zero (i.e., are counts still available). If the number of counts remaining is zero, then the processing of the true hot spot pixel map (i.e., operation 110) is performed. If there are counts remaining, then, at 230, the image is processed with a pixel update process to merge the "false" hot spot with identified background features. At 232, the image is updated with the false hot spot merged with background pixels (i.e., so that the false hot spot is removed at the next iteration of operations 220).

Figure 6:
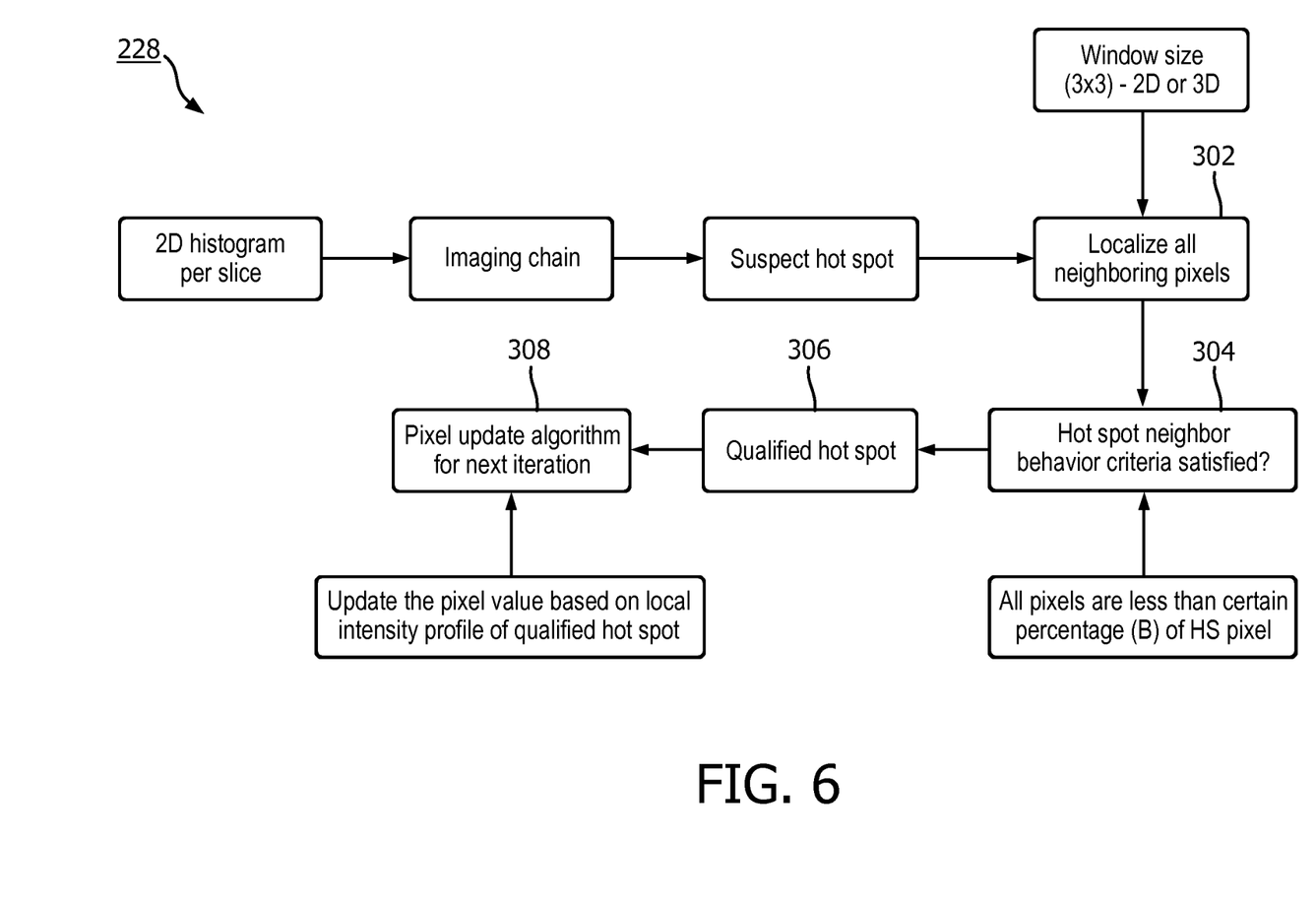
FIG. 6 shows an exemplary flow chart operation of some of the operations of FIG. 4.

FIG. 6 shows the HSSQ process 224 in more detail. The HSSQ process 224 is needed because the 2D histogram analysis generates many suspected hot spots. The HSSQ process 224 includes operations 302-308. At 302, for each suspected hot spot in the image, all neighboring pixels of the suspected hot spot are localized using an adaptive 2D or 3D window size (e.g., a 3×3 volume elements window size). At 304, it is determined whether a hot spot neighbor behavior criteria is satisfied for each hot spot. For example, the criteria can be whether all pixels are less than a certain percentage (e.g., 60%) of a suspected hot spot pixel maximum grayscale intensity value. If the criteria satisfied, then, at 306, the suspected hot spot is labeled as a qualified hot spot. Alternatively a voting process determined from the neighborhood of pixels of the suspected hot spot can be implemented to design the HSSQ process 224. At 308, the pixel update process (at 230) is updated based on the local intensity profile of the qualified hot spot for the next iteration.

In some embodiments, the operations 110 and 112 can include determining a bin for each suspected hot spot in the binning configuration; fitting a model for an evolution of each pixel in each suspected hot spot in each bin of the binning configuration over the plurality of update images produced by the iterative image reconstruction; determining a curve fitting process (e.g., a quadratic, a polynomial, and the like) for a curve for each binning configuration; extracting values of each pixel of each suspected hot spot; fitting the quadratic for each extracted value; and applying the model and the quadratic to an evaluation process to determine true hot spots.

Figure 7:
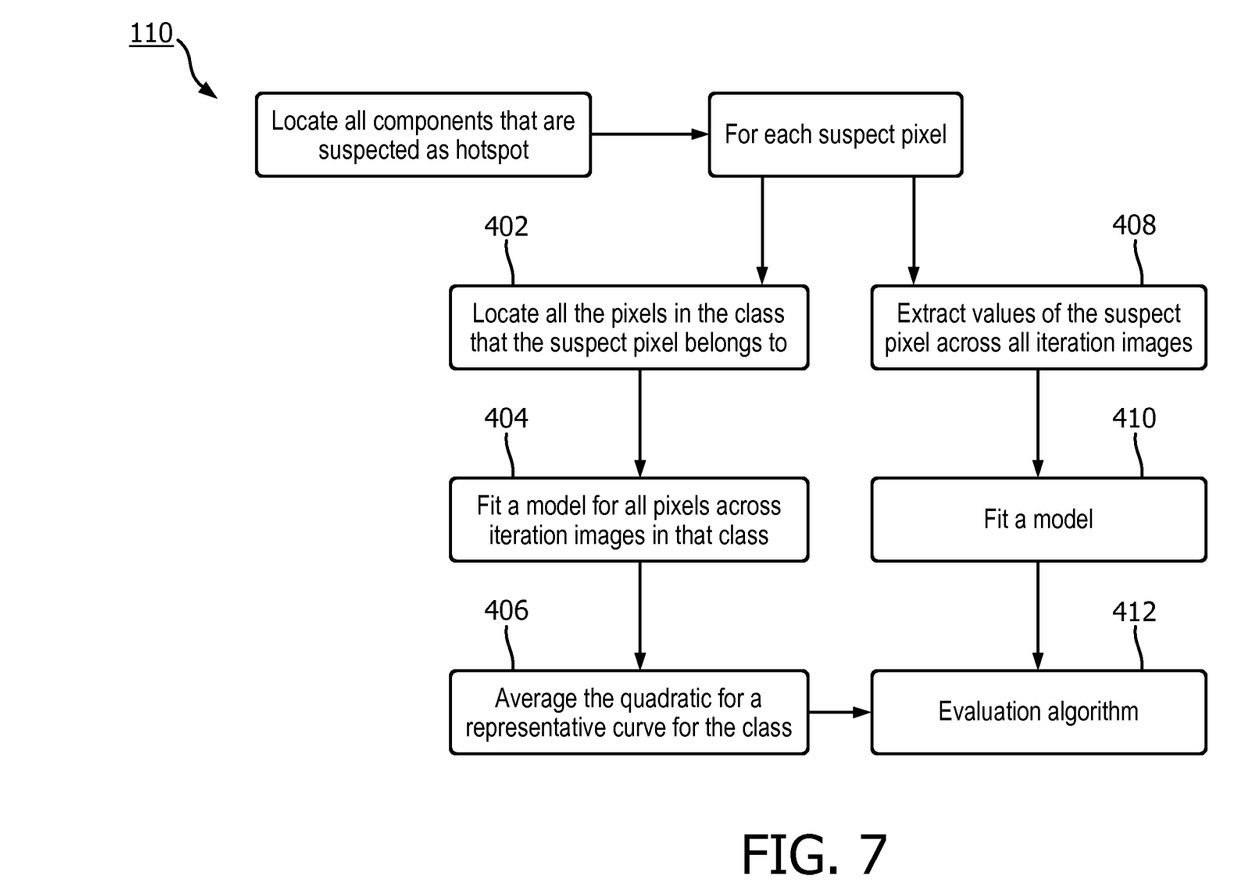
FIG. 7 shows an exemplary flow chart operation of some of the operations of FIG. 2.

FIG. 7 shows the operation 110 in more detail. The operation 110 includes operations 402-412. At 402, for each suspect pixel, all pixels are located in the class of the histogram that the suspect pixel belongs to. At 404, a first quadratic model is fit for all pixels across all iteration images in that class. At 406, the first quadratic is averaged for a representative curve for the class. The representative curve is computed because a suspect pixel may get value of the high intensity feature class, but its evolution may not be the same. Thus the evolution curve of the pixel must be close to the evolution curve of the representative class for it qualify as a feature, along with actual pixel value in the representative image. At 408, for each suspect pixel, values of the suspect pixel are extracted across all iteration images. At 410, a second quadratic model is fit for all pixels for all images in that class. At 412, the averaged first quadratic model and the second quadratic formula are evaluated with an evaluation process.

Figure 8:
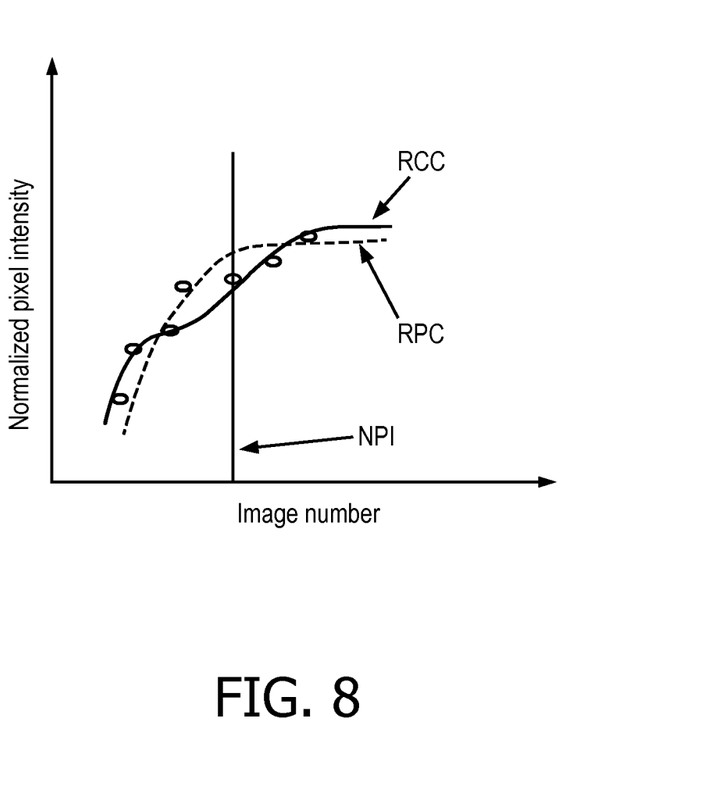
FIG. 8 shows an exemplary flow chart operation of some of the operations of FIG. 7.

FIG. 8 shows an example of the evaluation process 412. As shown in FIG. 8, a representative pixel curve (RPC) and a representative class curve (RCC) are calculated. The evaluation algorithm computes the normalized pixel intensity (NPI) from RPC and RCC. If the percentage difference from the two values from these curves is more than, for example, 0.5%, it is considered as a false hot spot. The 0.5% threshold is selected as an empirically derived value. This value may change depending on several parameters such as region in which suspect hot spot is present, or reconstruction algorithm and other parameters used. This value can be adaptable for different suspect hot spots, and a value of 0.5 is a generic value. The value of the evaluation criteria is very tight, so that we do not misidentify any hot spot pixels hot spot In some embodiments, the operation 114 includes suppressing hot spots identified by the generated hot spot artifact map in an intermediate update image produced by the iterative image reconstruction; and continuing the iterative image reconstruction starting from the intermediate update image with the suppressed hot spots.

Figure 9:
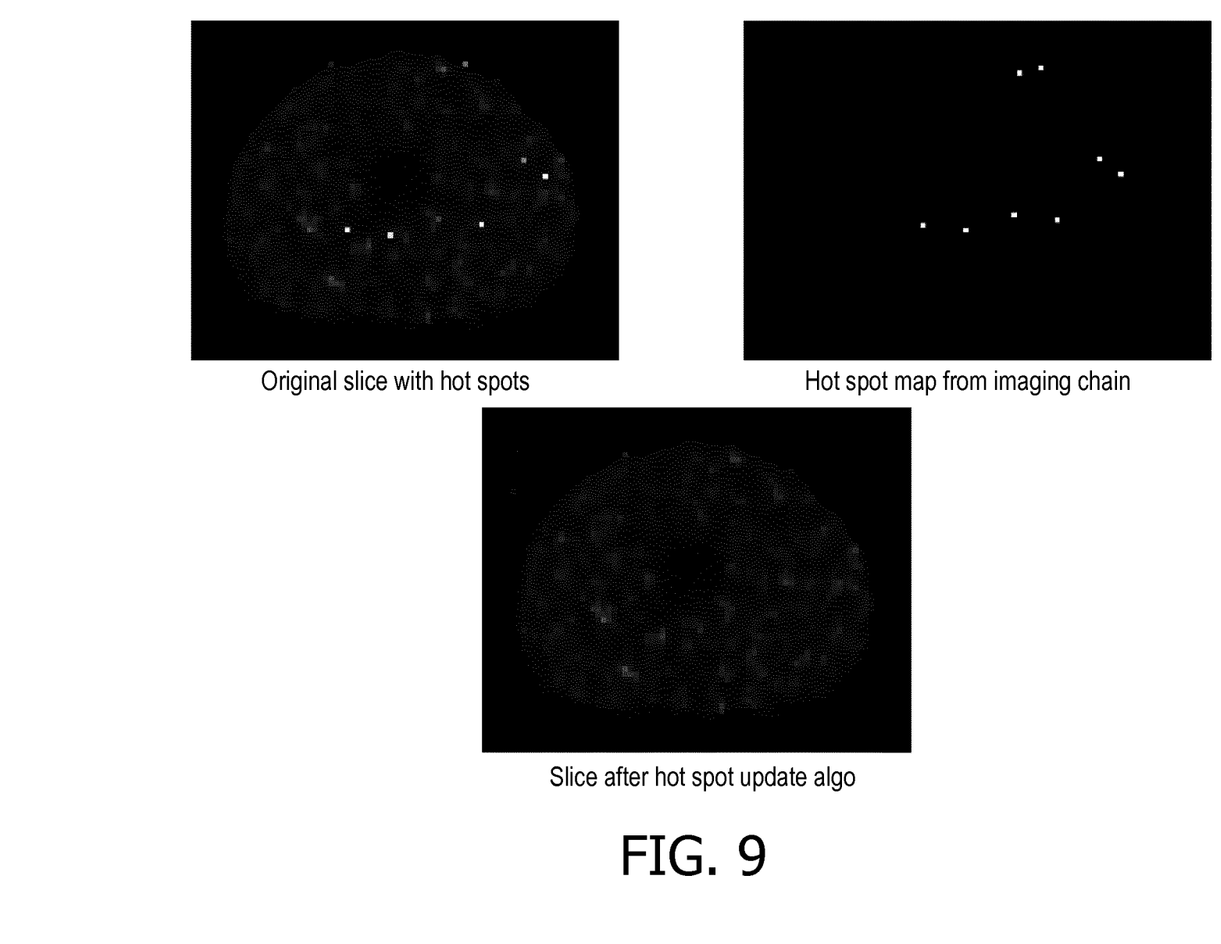
FIG. 9 shows images reconstructed by the operations of FIG. 2.

FIG. 9 shows example images from the reconstruction method 100. The original slice with hot spots (depicted by white boxes) is selected at operation 104. The hot spot map (depicted by white boxes corresponding to the white boxes in the selected image) is generated from operations 106-112. The hot spot map is applied to the selected image to remove the hot spots (as shown by the white boxes being eliminated in the updated image).

The disclosure has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A non-transitory computer-readable medium storing instructions readable and executable by at least one electronic processor to perform an image reconstruction method, the method comprising:
    performing iterative image reconstruction of imaging data acquired using an image acquisition device;
    selecting an update image from a plurality of update images produced by the iterative image reconstruction;
    processing the selected update image to generate a hot spot artifact map; and
    suppressing hot spots identified by the generated hot spot artifact map in a reconstructed image output by the iterative image reconstruction.

2. The non-transitory computer-readable medium of claim 1, wherein the processing includes:
    labeling features and background in the selected image from imaging counts in the selected image with a three dimensional connected components analysis;
    removing the labeled features and background in the selected image; and
    updating the selected image with the removed features and background.

3. The non-transitory computer-readable medium of claim 2, wherein the processing includes:
    labeling suspected hot spots in the selected image with the three dimensional connected components analysis;
    applying a hot spot suspect qualification process to the labeled suspected hot spots to determine hot spots in the selected image; and
    generating the hot spot artifact map with the determined hot spots.

4. The non-transitory computer-readable medium of claim 3, further including:
    updating a pixel updating process with the determined hot spots,
    wherein the labeling, applying, generating, and updating are repeated until no imaging counts remain in the selected image.

5. The non-transitory computer-readable medium of claim 3, wherein the hot spot suspect qualification process includes:
    determining whether a hot spot is a true hot spot based on analysis of a window of neighboring image pixels including the suspected hot spot; and
    updating the pixel updating process with the determined true hot spots.

6. The non-transitory computer-readable medium of claim 1, wherein the processing includes:
    normalizing the selected image;
    applying an edge detection transform to the normalized image;
    generating a histogram representing a pixel count of the image having the edge detection transform applied thereto;

determining a binning configuration of the histogram; and
determining one or more hot spots in the selected image using the binning configuration.

7. The non-transitory computer-readable medium of claim 6, wherein the processing includes:
determining a bin for the one or more hot spots in the binning configuration;
fitting a model for an evolution of pixels in the one or more hot spots in bins of the binning configuration over the plurality of update images produced by the iterative image reconstruction;
determining a fitted curve for each binning configuration;
extracting values of each pixel of each suspected hot spot;
fitting the fitted curve for each extracted value;
applying the model and the fitted curve to an evaluation process to determine true hot spots.

8. The non-transitory computer-readable medium of claim 1, wherein the selecting of the update image from the plurality of update images produced by the iterative image reconstruction includes:
determining a maximum number of suspected hot spots in obtained images of the imaging data;
determining when the maximum number of hot spots in each of the obtained images is constant, and
selecting the image at the determination of the constant number of suspected hot spots.

9. The non-transitory computer-readable medium of claim 1, wherein the suppressing hot spots in the reconstructed image output by the iterative image reconstruction includes:
suppressing hot spots identified by the generated hot spot artifact map in an intermediate update image produced by the iterative image reconstruction; and
continuing the iterative image reconstruction starting from the intermediate update image with the suppressed hot spots.

10. An image processing device comprising:
an electronic processor; and
a non-transitory computer-readable medium storing instructions readable and executable by the electronic processor to perform an image reconstruction method comprising:
performing iterative image reconstruction of imaging data acquired using an image acquisition device;
selecting an update image from a plurality of update images produced by the iterative image reconstruction;
processing the selected update image to generate a hot spot artifact map; and
suppressing hot spots identified by the generated hot spot artifact map in a reconstructed image output by the iterative image reconstruction.

11. The non-image processing device of claim 10, wherein the processing includes:
labeling features and background in the selected image from imaging counts in the selected image with a three dimensional connected components analysis;
removing the labeled features and background in the selected image; and
updating the selected image with the removed features and background.

12. The image processing device of claim 11, wherein the processing includes:
labeling suspected hot spots in the selected image with the three dimensional connected components analysis;
applying a hot spot suspect qualification process to the labeled suspected hot spots to determine hot spots in the selected image;
generating the hot spot artifact map with the determined hot spots; and
updating a pixel updating process with the determined hot spots,
wherein the labeling, applying, generating, and updating are repeated until no imaging counts remain in the selected image.

13. The image processing device of claim 12, wherein the hot spot suspect qualification process includes:
determining whether a hot spot is a true hot spot based on analysis of a window of neighboring image pixels including the suspected hot spot; and
updating the pixel updating process with the determined true hot spots.

14. The image processing device of claim 10, wherein the processing includes:
normalizing the selected image;
applying an edge detection transform to the normalized image;
generating a histogram representing a pixel count of the image having the edge detection transform applied thereto;
determining a binning configuration of the histogram; and
determining one or more hot spots in the selected image using the binning configuration.

15. The image processing device of claim 14, wherein the processing includes:
determining a bin for the one or more hot spots in the binning configuration;
fitting a model for an evolution of pixels in the one or more hot spots in bins of the binning configuration over the plurality of update images produced by the iterative image reconstruction;
determining a fitted curve for each binning configuration;
extracting values of each pixel of each suspected hot spot;
fitting the fitted curve for each extracted value;
applying the model and the fitted curve to an evaluation process to determine true hot spots.

16. The image processing device of claim 10, wherein the selecting of the update image from the plurality of update images produced by the iterative image reconstruction includes:
determining a maximum number of the one or more hot spots in obtained images of the imaging data;
determining when the maximum number of hot spots in each of the obtained images is constant; and
selecting the image at the determination of the constant number of suspected hot spots.

17. The image processing device of claim 16, wherein the suppressing hot spots in the reconstructed image output by the iterative image reconstruction includes:
suppressing hot spots identified by the generated hot spot artifact map in an intermediate update image produced by the iterative image reconstruction; and
continuing the iterative image reconstruction starting from the intermediate update image with the suppressed hot spots.

18. An image processing device comprising:
an electronic processor; and
a non-transitory computer-readable medium storing instructions readable and executable by the electronic processor to perform an image reconstruction method comprising:
performing iterative image reconstruction of imaging data acquired using an image acquisition device;
generating a hot spot artifact map from an update image produced by the iterative image reconstruction using an iterative process in which each iteration includes (i) thresholding the pixels of the update image using a threshold selected for the iteration to produce a thresholded image and (ii) performing a three-dimensional connectivity analysis on the thresholded image to identify suspected hot spots and background regions; and suppressing the hot spots identified by the hot spot artifact map in a reconstructed image output by the iterative image reconstruction.

19. The image processing device of claim 18, wherein the thresholding is performed in two-dimensional slices of the update image.

20. The image processing device of claim 19, wherein each iteration further includes (iii) qualifying suspected hot spots using a size criterion in which suspected hot spots smaller than the size criterion are identified as hot spots.

* * * * *